(12) United States Patent
Nagano et al.

(10) Patent No.: US 12,485,902 B2
(45) Date of Patent: Dec. 2, 2025

(54) VEHICLE COMPELLING FORCE DETECTION APPARATUS CAPABLE OF DETECTING COMPELLING FORCE DUE TO WIND DISTURBANCE APPLIED TO VEHICLE

(71) Applicant: SUBARU CORPORATION, Tokyo (JP)

(72) Inventors: Hiroki Nagano, Tokyo (JP); Yuta Takenoya, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 268 days.

(21) Appl. No.: 17/942,745

(22) Filed: Sep. 12, 2022

(65) Prior Publication Data

US 2023/0101331 A1 Mar. 30, 2023

(30) Foreign Application Priority Data

Sep. 28, 2021 (JP) .................................. 2021-157619

(51) Int. Cl.
*B60W 40/06* (2012.01)
*B60W 40/13* (2012.01)

(52) U.S. Cl.
CPC ............ *B60W 40/06* (2013.01); *B60W 40/13* (2013.01); *B60W 2422/80* (2013.01)

(58) Field of Classification Search
CPC ... B60W 2422/80; B60W 40/13; B60W 40/06
See application file for complete search history.

(56) References Cited

U.S. PATENT DOCUMENTS

2017/0334444 A1\* 11/2017 Hawes ................. B62D 15/025
2020/0307603 A1\* 10/2020 Kobayashi ............ B60W 40/06

FOREIGN PATENT DOCUMENTS

| JP | 2002-211380 A | 7/2002 |
|----|---------------|--------|
| JP | 2006-349440 A | 12/2006 |
| JP | 2010-195323 A | 9/2010 |

(Continued)

OTHER PUBLICATIONS

Office Action issued in Japanese Patent Application No. 2021-157619 dated Apr. 30, 2025. (including English translation).

*Primary Examiner* — Adnan M Mirza
(74) *Attorney, Agent, or Firm* — TROUTMAN PEPPER LOCKE LLP

(57) ABSTRACT

A vehicle compelling force detection apparatus includes one or more processors configured to: obtain, from a first sensor, a road surface disturbance force received from a road surface on which the vehicle drives via a wheel of the vehicle, and store the road surface disturbance force in one or more memories, the first sensor being disposed below a damper supporting the wheel in a direction of gravity; obtain, from a second sensor, a body disturbance force applied to the vehicle, and store the body disturbance force in the one or more memories, the second sensor being disposed above the damper in the direction of gravity; and detect the compelling force due to the wind disturbance to which the vehicle is subjected, based on the body disturbance force applied to the vehicle and the road surface disturbance force, which are stored in the one or more memories.

15 Claims, 10 Drawing Sheets

(56) References Cited

FOREIGN PATENT DOCUMENTS

| | | |
|---|---|---|
| JP | 2011-240824 A | 12/2011 |
| JP | 2014-13006 A | 1/2014 |
| JP | 2017-060351 A | 3/2017 |
| KR | 10-0868408 B1 | 11/2008 |

* cited by examiner

VEHICLE COMPELLING FORCE DETECTION APPARATUS CAPABLE OF DETECTING COMPELLING FORCE DUE TO WIND DISTURBANCE APPLIED TO VEHICLE

CROSS-REFERENCE TO RELATED APPLICATION

The present application claims priority from Japanese Patent Application No. 2021-157619 filed on Sep. 28, 2021, the entire contents of which are hereby incorporated by reference.

BACKGROUND

The disclosure relates to a vehicle compelling force detection apparatus that is installed in, for example, a vehicle and that is capable of detecting a compelling force due to a wind disturbance to which the vehicle is subjected while driving.

Transportation means is indispensable in modern society, and various vehicles such as automobiles move on the road in daily life. It is beneficial for such vehicles to enhance driving stability against crosswinds and road surface disturbances to which the vehicles are subjected while driving.

For example, Japanese Unexamined Patent Application Publication (JP-A) No. 2002-211380 proposes a technique for stabilizing the attitude of a vehicle by generating a disturbance suppression yaw moment in the case where a lateral acceleration occurs and a disturbance yaw moment acts on the vehicle when the vehicle, which is driving straight, is subjected to a crosswind disturbance or a road surface disturbance such as a rutted road.

In addition, JP-A No. 2014-013006 proposes a technique in which a vehicle body disturbance determination unit determines that a change in steering angle is due to a vehicle body disturbance when the rising timing of a sensor value from a vehicle body disturbance sensor satisfies a non-driver steering determination condition.

Furthermore, JP-A No. 2006-349440 discloses that a tire force sensor is provided inside an axle in the vicinity of each wheel, and a longitudinal force Fx, a lateral force Fy, and a vertical force Fz acting on the tire are detected by the tire force sensor.

SUMMARY

An aspect of the disclosure provides a vehicle compelling force detection apparatus that is installable in a vehicle and capable of detecting a compelling force due to a wind disturbance. The vehicle compelling force detection apparatus includes one or more processors, and one or more memories coupled to the one or more processors so as to be able to communicate with the one or more processors. The one or more processors are configured to obtain, from a first sensor, a road surface disturbance force received from a road surface on which the vehicle drives via a wheel of the vehicle, and store the road surface disturbance force in the one or more memories. The first sensor is disposed below a damper supporting the wheel in a direction of gravity. The one or more processors are configured to obtain, from a second sensor a body disturbance force applied to the vehicle, and store the body disturbance force in the one or more memories. The second sensor is disposed above the damper in the direction of gravity. The one or more processors are configured to detect the compelling force due to the wind disturbance to which the vehicle is subjected, based on the body disturbance force applied to the vehicle and the road surface disturbance force, which are stored in the one or more memories.

An aspect of the disclosure provides a vehicle. The vehicle includes a first sensor, a second sensor, and the above-described compelling force detection apparatus. The first sensor is disposed below a damper of the vehicle in a direction of gravity. The first sensor is configured to detect a road surface disturbance force received from a road surface via a wheel of the vehicle. The second sensor is disposed above the damper in the direction of gravity. The second sensor is configured to detect a body disturbance force applied to the vehicle.

BRIEF DESCRIPTION OF THE DRAWINGS

The accompanying drawings are included to provide a further understanding of the disclosure and are incorporated in and constitute a part of this specification. The drawings illustrate example embodiments and, together with the specification, serve to describe the principles of the disclosure.

DETAILED DESCRIPTION

Current techniques, including but not limited to the techniques discussed in the above patent documents, do not yet meet the needs of the market, and the following issues are present.

That is, in the case of JP-A 2002-211380, no distinction is made between disturbances caused by winds and disturbances from road surface inputs, and, because all disturbances acting on the vehicle are handled as a whole, there is much room for further improvement of vehicle stability. In addition, in the case of JP-A No. 2014-013006, because the driver's steering is additionally used for determining a disturbance, it takes a relatively long time to calculate a disturbance caused by wind. Moreover, in the case of JP-A No. 2006-349440, although the tire force sensor is capable of accurately detecting a disturbance caused by a road surface input, there is no specific mention about detection of a disturbance caused by wind.

It is desirable to provide a control apparatus capable of accurately and quickly detecting a disturbance caused by wind to which a vehicle is subjected while driving, and a vehicle in which the control apparatus is installed.

In the following, some embodiments of the disclosure are described in detail with reference to the accompanying drawings. Note that the following description is directed to illustrative examples of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description. Configurations aside from those described in detail below may be supplemented, as appropriate, with on-board sensors of the related art and element technology and configurations related to disturbance detection, including the above patent documents.

Figure 1:
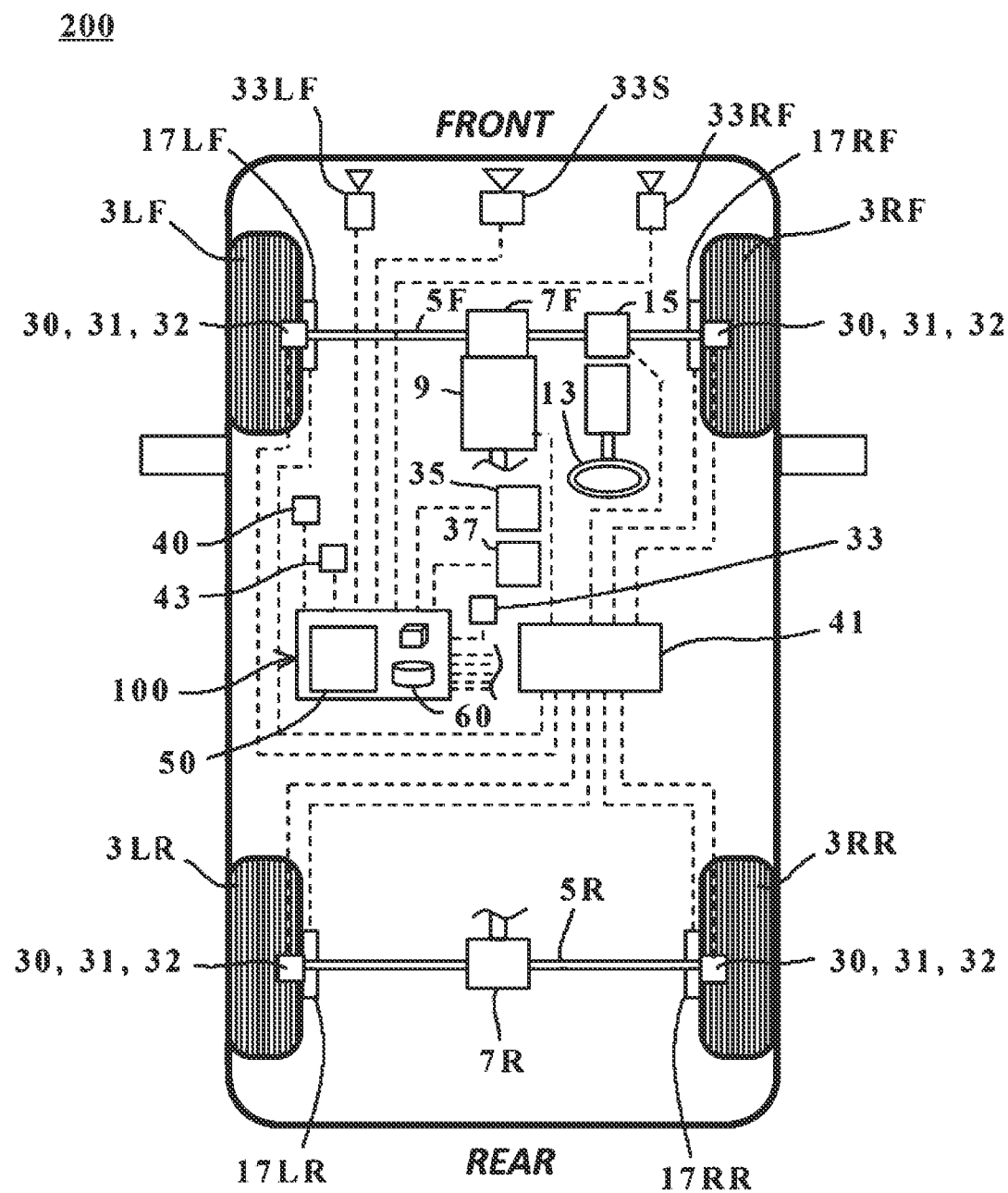
FIG. 1 is a schematic diagram illustrating an exemplary configuration of a vehicle with a control apparatus and a compelling force detection apparatus according to a first embodiment.

FIG. 1 illustrates an exemplary configuration of a vehicle 200 according to a first embodiment. Hereinafter, a four-wheel-drive vehicle is exemplified as a vehicle suitable for the present embodiment; however, the present embodiment may be applied to vehicles other than four-wheeled vehicles, such as two-wheeled vehicles, as long as the gist of the disclosure is not obstructed.

FIG. 1 is a schematic diagram illustrating an exemplary configuration of the vehicle 200 equipped with a compelling force detection apparatus 100 according to the present embodiment. The vehicle 200 illustrated in FIG. 1 is configured as a four-wheel drive vehicle that transmits drive torque output from a drive power source 9, which generates vehicle drive torque, to a left front wheel 3LF, a right front wheel 3RF, a left rear wheel 3LR, and a right rear wheel 3RR (hereinafter they are collectively referred to as "wheels 3" when no particular distinction is necessary). The drive power source 9 may be an internal combustion engine such as a gasoline engine or a diesel engine, or may be a drive motor; alternatively, the drive power source 9 may include both an internal combustion engine and a drive motor.

Note that the vehicle 200 may be, for example, an electric automobile equipped with two drive motors, a front-wheel drive motor and a rear-wheel drive motor, or may be an electric automobile equipped with drive motors individually for the wheels 3. In addition, in the case where the vehicle 200 is an electric automobile or a hybrid electric automobile, the vehicle 200 is equipped with a secondary battery that stores power supplied to the drive motors, and a generator such as a motor or a fuel cell that generates power charged in the battery.

The vehicle 200 includes, as equipment used for vehicle drive control, the drive power source 9, an electric steering apparatus 15, and a brake fluid pressure control unit of the related art. The drive power source 9 outputs drive torque transmitted to a front wheel drive shaft 5F and a rear wheel drive shaft 5R via a transmission (not illustrated), a front wheel differential mechanism 7F, and a rear wheel differential mechanism 7R. Driving of the drive power source 9 and the transmission is controlled by a vehicle control apparatus 41, which includes one or more electronic control units (ECUs).

The front wheel drive shaft 5F is provided with the electric steering apparatus 15. The electric steering apparatus 15 includes an electric motor and a gear mechanism (not illustrated), and, under control of the vehicle control apparatus 41, adjusts the steering angle of the left front wheel 3LF and the right front wheel 3RF. During manual operation, the vehicle control apparatus 41 controls the electric steering apparatus 15 on the basis of the angle of steering by the driver of a steering wheel 13.

A brake system of the vehicle 200 is configured as a hydraulic brake system. The brake fluid pressure control unit generates a braking force by adjusting hydraulic pressures supplied to brake calipers 17LF, 17RF, 17LR, and 17RR (hereinafter they may be collectively referred to as "brake calipers 17" when no distinction is necessary), which are provided in the front and rear and left and right drive wheels 3LF, 3RF, 3LR, and 3RR, respectively. Driving of the brake fluid pressure control unit is controlled by the vehicle control apparatus 41. In the case where the vehicle 200 is an electric automobile or a hybrid electric automobile, the brake fluid pressure control unit is used in combination with regenerative braking by the drive motors.

The vehicle control apparatus 41 includes one or more ECUs that control the driving of the drive power source 9, which outputs drive torque of the vehicle 200, the electric steering apparatus 15, which controls the steering angle of the steering wheel 13 or the steered wheels, and the brake fluid pressure control unit, which controls the braking force of the vehicle 200. The vehicle control apparatus 41 may have the function of controlling the driving of the transmission, which changes the speed of the output from the drive power source 9 and transmits it to the wheels 3. The vehicle control apparatus 41 is configured to be capable of obtaining information sent from the later-described compelling force detection apparatus 100, and is configured to be capable of executing vehicle control based on a compelling force due to a wind disturbance calculated by the compelling force detection apparatus 100.

The vehicle 200 may also include at least one wind-disturbance compelling-force detection sensor pair 30, a surrounding environment sensor 33, a vehicle state sensor 35, a global positioning system (GPS) sensor 37, a navigation system 40, and a human machine interface (HMI) 43.

Among them, the wind-disturbance compelling-force detection sensor pair 30 is used for detecting a compelling force due to a wind disturbance to which the vehicle 200 is subjected while driving in the present embodiment. In one example, as understood from FIGS. 1 and 2, the wind-disturbance compelling-force detection sensor pair 30 includes a first sensor 31, which is disposed below, in the direction of gravity, a damper 4, which supports the wheel 3 of the vehicle 200, and a second sensor 32, which is disposed above the damper 4 in the direction of gravity.

The first sensor 31 is disposed below the damper 4 of the vehicle 200 in the direction of gravity, and has the function of detecting a road surface disturbance force received from the road surface via the tire (wheel 3) of the vehicle 200. The first sensor 31 as described above may be provided, for example, in the wheel hub provided between the wheel 3 and the axle. Therefore, in the present embodiment, a hub sensor installable in the hub of the axle is applied as the first sensor 31. As a specific example of such a hub sensor, for example, a tire force sensor of the related art capable of detecting a force in Fz direction perpendicular to the direction of gravity is applicable.

The second sensor 32 is provided at the upper end of the damper 4 and is configured to be capable of detecting an external force (particularly a force in Fz direction perpendicular to the direction of gravity) to which a body 1 is subjected. In other words, the second sensor 32 in the present embodiment is disposed above the damper 4 in the direction of gravity and has the function of detecting a body disturbance force applied to the body 1 of the vehicle 200. A specific example of the second sensor 32 mentioned above is not limited as much as possible; for example, as illustrated in FIG. 2, a top mount sensor of the related art installed in a top mount (may also be referred to as an upper mount) of the related art, which is a fastening part between the body 1 and the damper 4 of the vehicle 200, is suitable.

Figure 2:
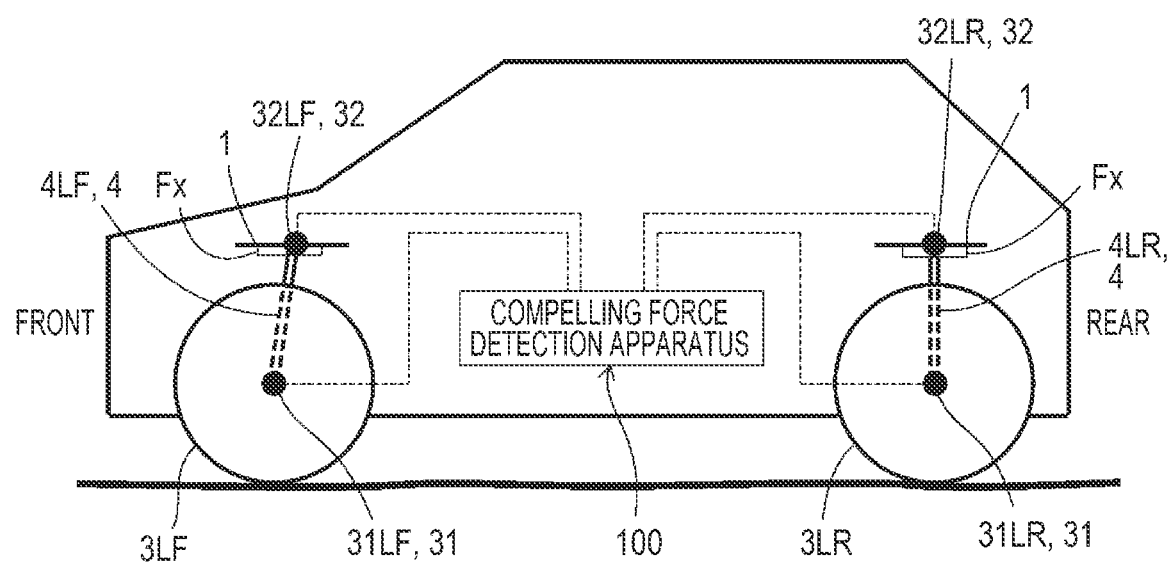
FIG. 2 is a schematic diagram illustrating a layout form of the control apparatus, a first sensor, and a second sensor according to the first embodiment.

As illustrated in FIG. 2, in the present embodiment, the wind-disturbance compelling-force detection sensor pair 30 (a first sensor 31LF and a second sensor 32LF) provided at the upper and lower ends of the damper 4 (a damper 4LF) corresponding to the left front wheel 3LF among the wheels 3 of the vehicle 200 will be described by way of example. However, in the present embodiment, the wheel 3 where the wind-disturbance compelling-force detection sensor pair 30 is installed is not limited to the left front wheel 3LF as described above, and, for example, the wind-disturbance compelling-force detection sensor pair 30 may be installed in the right front wheel 3RF, or on the rear wheel side such as in the left rear wheel 3LR illustrated in FIG. 2.

The surrounding environment sensor 33 may be configured including, for example, forward imaging cameras 33LF and 33RF, and a Light Detection and Ranging (LiDAR) 33S, which are of the related art.

The forward imaging cameras 33LF and 33RF and the LiDAR 33S constitute the surrounding environment sensor 33 for obtaining information on the surrounding environment of the vehicle 200. The forward imaging cameras 33LF and 33RF may include, for example, imaging elements such as charged-coupled devices (CCDs) or complementary metal-oxide-semiconductor (CMOS) of the related art. The vehicle 200 may include, besides the front imaging cameras 33LF and 33RF, a camera of the related art installed in a side-view mirror to image the left rear or the right rear.

The LiDAR 33S transmits optical waves, receives the reflected waves of the optical waves, and detects an object and a distance to the object on the basis of the time between transmission of the optical waves and reception of the reflected waves. The vehicle 200 may include, as the surrounding environment sensor 33 for obtaining information on the surrounding environment, instead of the LiDAR 33S or in addition to the LiDAR 33S, one or more sensors of the related art among radar sensors such as millimeter wave radars, and ultrasonic sensors.

The vehicle state sensor 35 includes one or more sensors of the related art, which are installed in the vehicle 200 separately from the above-described wind-disturbance compelling-force detection sensor pair 30 and which detect the operation state and behavior of the vehicle 200. The vehicle state sensor 35 may include at least one of, for example, a steering angle sensor, an acceleration position sensor, a brake stroke sensor, a brake pressure sensor, or an engine speed sensor, and detect the operation state of the vehicle 200, such as the steering angle of the steering wheel 13 or the steered wheels, accelerator opening, brake operation amount, or engine speed.

In addition, the vehicle state sensor 35 may include at least one of, for example, a vehicle speed sensor, an acceleration sensor, or an angular velocity sensor, and detect the behavior of the vehicle 200, such as the vehicle speed, longitudinal acceleration, lateral acceleration, or yaw rate. The vehicle state sensor 35 may also include a sensor for detecting the operation of a direction indicator, and detect the operation state of the direction indicator. The vehicle state sensor 35 may additionally include a sensor for detecting the inclination state of the vehicle 200 and detect the inclination state of the road.

The navigation system 40 is a navigation system of the related art that sets a drive route to a destination set by an occupant, and informs the driver of the drive route. The GPS sensor 37 is coupled to the navigation system 40, and the navigation system 40 receives a satellite signal from a GPS satellite via the GPS sensor 37, and obtains position information of the vehicle 200 on map data. Instead of the GPS sensor 37, an antenna for receiving a satellite signal from another satellite system that identifies the position of the vehicle 200 may be used.

The HMI 43 is driven by, for example, a later-described controller 50, and is capable of presenting various types of information to the driver by means of image display, audio output, etc. The HMI 43 may include, for example, a display device of the related art that is provided in an instrumental panel, and a loudspeaker of the related art that is provided in the vehicle 200. Among them, the display device may have the function of the display device of the navigation system 40. The HMI 43 may also include a head-up display for displaying an image on the front window of the vehicle 200.

Next, with reference to FIGS. 1 to 5 and the like, the compelling force detection apparatus 100 according to the present embodiment, which detects a compelling force due to a wind disturbance to which the vehicle 200 is subjected while driving, will be described in detail.

Note that the term "wind disturbance" in the present embodiment is different from a constant wind to which a vehicle is usually subjected while driving; the term "wind disturbance" refers to a disturbance caused by a wind different from a wind that relatively occurs as a result of the movement of the vehicle, such as a gust or a crosswind.

Figure 3:
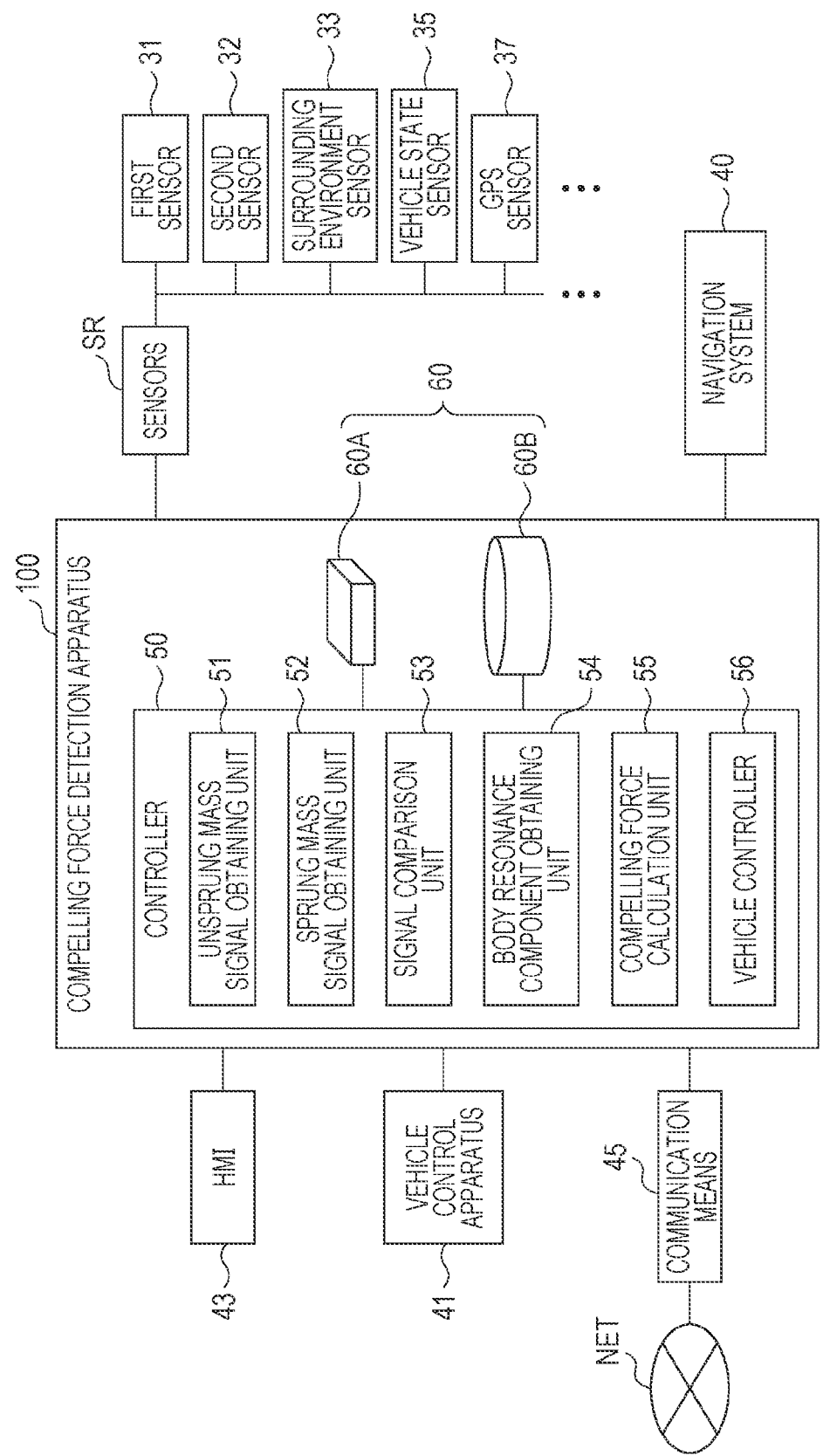
FIG. 3 is a block diagram illustrating an exemplary configuration around the control apparatus and the compelling force detection apparatus according to the first embodiment.

FIG. 3 is a block diagram illustrating an exemplary configuration of the compelling force detection apparatus 100 according to the present embodiment.

Sensors SR (first sensor 31, second sensor 32, surrounding environment sensor 33, vehicle state sensor 35, GPS sensor 37, etc.) are coupled to the compelling force detection apparatus 100 with communication means such as dedicated lines, a controller area network (CAN), or local internet (LIN) interposed therebetween. In addition, the navigation system 40, the vehicle control apparatus 41, and the HMI 43 described above are coupled to the compelling force detection apparatus 100 with communication means such as dedicated lines, CAN, or LIN interposed therebetween. Moreover, the compelling force detection apparatus 100 is configured to be capable of coupling to an external network NET such as the Internet with communication means 45 of the related art interposed therebetween.

The compelling force detection apparatus 100 in the present embodiment as described above includes the controller 50, and a memory 60 of the related art (for example, at least one of a random-access memory (RAM) 60A or a hard disk drive (HDD) 60B). The controller 50 is configured including a processor such as one or more central processing units (CPUs) of the related art. The controller 50 may be partially or entirely formed of one that is updatable, such as firmware, or may be a program module executed in response to a command from the CPU or the like.

Note that the memory 60 described above may be constituted of, instead of the above, for example, read only memory (ROM), solid state drive (SSD), or an updatable recording medium of the related art, such as a universal serial bus (USB) flash or a storage device. Note that the number and type of storage units described above are not particularly limited in the present embodiment. The memory 60 in the present embodiment may be configured to record information such as a computer program executed by the controller 50, various parameters used for arithmetic processing, detection data, and arithmetic processing results.

As illustrated in FIG. 3, the controller 50 in the present embodiment includes an unsprung mass signal obtaining unit 51, a sprung mass signal obtaining unit 52, a signal comparison unit 53, a body resonance component obtaining unit 54, a compelling force calculation unit 55, and a vehicle controller 56. Note that the body resonance component obtaining unit 54 included in the controller 50 is not always necessary and may be omitted as appropriate. These units may be functions realized by execution of a computer program by a processor such as a CPU, and may be partially or entirely composed of analog circuits.

The unsprung mass signal obtaining unit 51 is configured with the function of obtaining, from the first sensor 31 described above, an unsprung mass signal $Fz_1$ (see FIGS. 4, 5, and the like) related to a road surface disturbance force (in one example, a force Fz component with respect to the vertical Z direction) received from the road surface on which the vehicle 200 drives. The unsprung mass signal obtaining unit 51 in the present embodiment is also configured with the function of storing the obtained unsprung mass signal $Fz_1$ related to the road surface disturbance force in the memory 60 described above.

The sprung mass signal obtaining unit 52 is configured with the function of obtaining, from the second sensor 32 described above, a sprung mass signal $Fz_2$ (see FIGS. 4, 5, and the like) related to a body disturbance force (in one example, a force Fz component with respect to the vertical Z direction) applied to the vehicle 200. The sprung mass signal obtaining unit 52 in the present embodiment is also configured with the function of storing the obtained sprung mass signal $Fz_2$ related to the body disturbance force in the memory 60 described above.

The signal comparison unit 53 is configured with the function of performing comparison processing of the unsprung mass signal $Fz_1$ related to the road surface disturbance force obtained from the first sensor 31 and the sprung mass signal $Fz_2$ related to the body disturbance force obtained from the second sensor 32. For example, the signal comparison unit 53 in the present embodiment is able to determine in time series whether either of the sprung mass signal $Fz_2$ or the unsprung mass signal $Fz_1$ described above exhibits a larger value.

The body resonance component obtaining unit 54 is configured with the function of obtaining a body resonance load as a body disturbance force applied to the vehicle 200 via the second sensor 32 described above. In one example, a resonance load component may be extracted by performing a process of filtering a resonance frequency narrow band calculated in advance by an experiment or simulation on the obtained sprung mass signal $Fz_2$ described above.

The compelling force calculation unit 55 is configured with the function of detecting a compelling force due to a wind disturbance to which the vehicle 200 is subjected, on the basis of the body disturbance force applied to the vehicle 200 and the road surface disturbance force received from the road surface on which the vehicle 200 drives, which are stored in the memory 60.

In one example, the compelling force calculation unit 55 in the present embodiment is able to detect, as a compelling force due to a wind disturbance, a load obtained by the second sensor 32, which obtains the sprung mass signal $Fz_2$ while the sprung mass signal $Fz_2$ corresponding to the above-described body disturbance force and the unsprung mass signal $Fz_1$ corresponding to the above-described road surface disturbance force are in the same phase period (at the time of in-phase fluctuation).

Note that the compelling force calculation unit 55 may detect a compelling force due to the above-described wind disturbance by further removing the resonance load from the body disturbance force applied to the vehicle 200. In one example, the resonance load component extracted by the body resonance component obtaining unit 54 may be removed from the sprung mass signal $Fz_2$ related to the body disturbance force obtained from the second sensor 32. The compelling force calculation unit 55 may determine the state of these phases (that is, whether they are in phase or out of phase) on the basis of the sprung mass signal $Fz_2$ related to the body disturbance force from which the resonance load component has been removed and the unsprung mass signal $Fz_1$ related to the road surface disturbance force, and detect a compelling force due to the wind disturbance.

Here, the principle of calculating a compelling force due to a wind disturbance using the unsprung mass signal $Fz_1$ and the sprung mass signal $Fz_2$ in the present embodiment will be described in detail using FIGS. 4 and 5.

Firstly, the inventors of the disclosure have diligently examined to find out that the phase of signals obtained by the wind-disturbance compelling-force detection sensor pair 30 installed at the upper and lower ends of the damper 4 changes between the case where the vehicle 200 is subjected to a compelling force due to a wind disturbance and the case where the vehicle 200 is subjected to a road surface disturbance received from the road surface on which the vehicle 200 drives.

Figure 4:
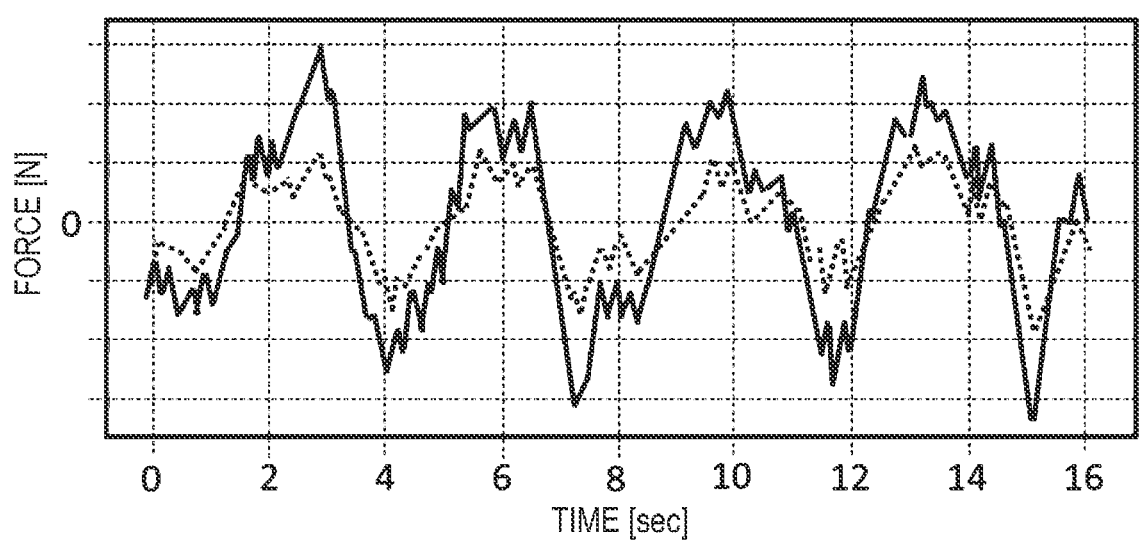
FIG. 4 is a schematic diagram illustrating exemplary signals from the first sensor and the second sensor according to the first embodiment.

In one example, at first, as illustrated in FIG. 4, in the case where the state in which the vehicle 200 which is driving is subjected to a compelling force due to a wind disturbance is dominant, the wheels 3 are supported by the road surface while the body 1 of the vehicle 200 is subjected to a compelling force due to a wind disturbance. In such a case, as will be understood from FIG. 4, the phase of the unsprung mass signal $Fz_1$ obtained by the first sensor 31 of the wind-disturbance compelling-force detection sensor pair 30 and the phase of the sprung mass signal $Fz_2$ obtained by the second sensor 32 will be in phase along time series.

Figure 5A:
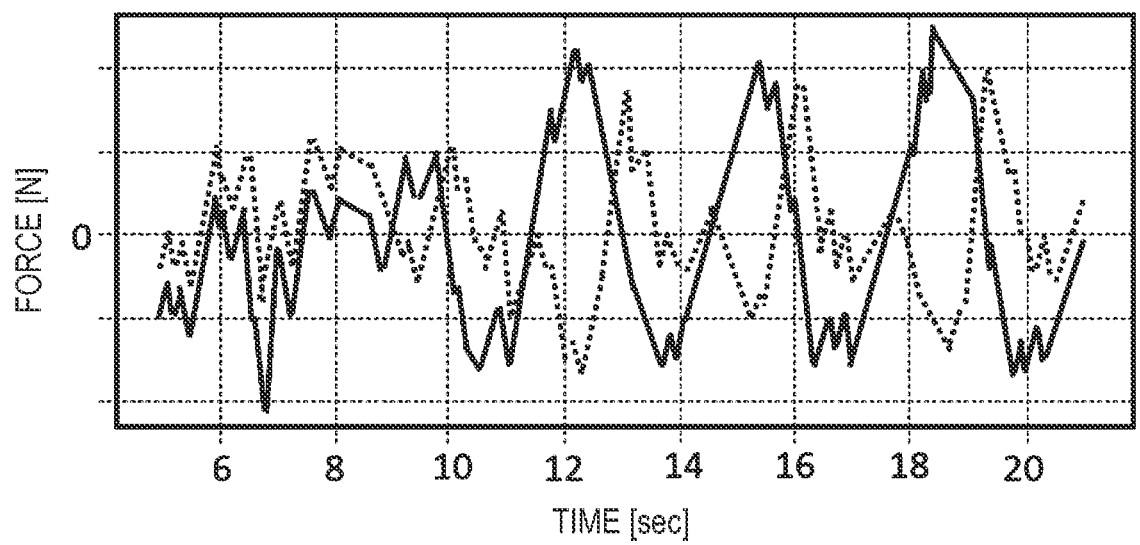
FIGS. 5A and 5B are schematic diagrams illustrating exemplary signals from the first sensor and the second sensor when, for example, a steering operation (tire input event) is performed.

In contrast, as illustrated in FIG. 5A, in the case where the state in which the vehicle 200 is subjected to a road surface disturbance from the road surface on which the vehicle 200 drives is dominant, the body 1 of the vehicle 200 is supported by the inertial force during driving while the body 1 is subjected to a compelling force from the wheels 3. In such a case, as will be understood from FIG. 5A, the phase of the unsprung mass signal $Fz_1$ obtained by the first sensor 31 of the wind-disturbance compelling-force detection sensor pair 30 and the phase of the sprung mass signal $Fz_2$ obtained by the second sensor 32 will be out of phase along time series.

Figure 5B:
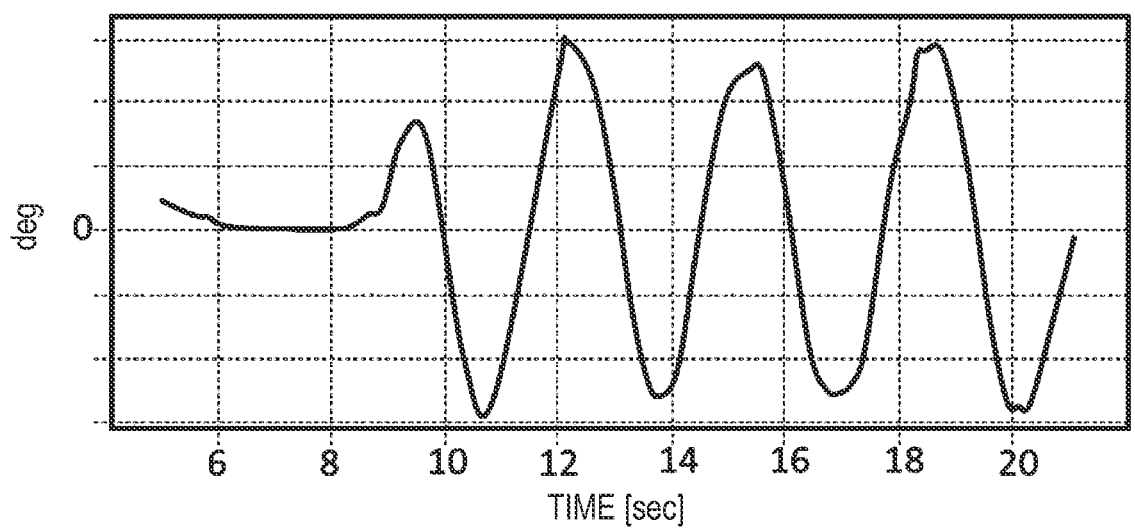

Note that an example of the state in which such a compelling force of the wheels 3 occurs includes a steering operation by the steering wheel 13 as illustrated by way of example in FIG. 5B. That is, as understood by comparing and referring to FIGS. 5A and 5B, for example, when a steering operation is performed to steer the wheels 3, the second sensor 32 installed on the outer wheel side generates an internal force in the sinking direction due to a roll load caused by the centrifugal force of the body 1. In contrast, in the first sensor 31 on the outer wheel side, an internal force in a direction opposite to the above-mentioned roll load is generated due to the effect of the axial rotation of a king pin at a fastening part with the damper 4.

Although an example in which a roll load is generated on the wheels 3 by a steering operation using the steering wheel 13 has been described as a state in which a compelling force of the wheels 3 occurs in the present embodiment, this is not the only possible example. That is, an example of a state in which a compelling force of the wheels 3 occurs includes the case in which the wheels 3 are subjected to a compelling force from unsteady and random undulation of the road surface. Even in the case where the wheels 3 are subjected to a compelling force due to such unevenness of the road surface, the phase of the unsprung mass signal $Fz_1$ obtained by the first sensor 31 and the phase of the sprung mass signal $Fz_2$ obtained by the second sensor 32 will be out of phase along time series.

The vehicle controller 56 has the function of controlling the vehicle 200 on the basis of a compelling force due to a wind disturbance detected by the compelling force calculation unit 55. Examples of vehicle control based on a compelling force due to such a wind disturbance include control that warns the occupant via the HMI 43, and control that adjusts the drive torque of the vehicle 200 corresponding to the compelling force via the vehicle control apparatus 41.

Method of Detecting Compelling Force Due to Wind Disturbance

Figure 6:
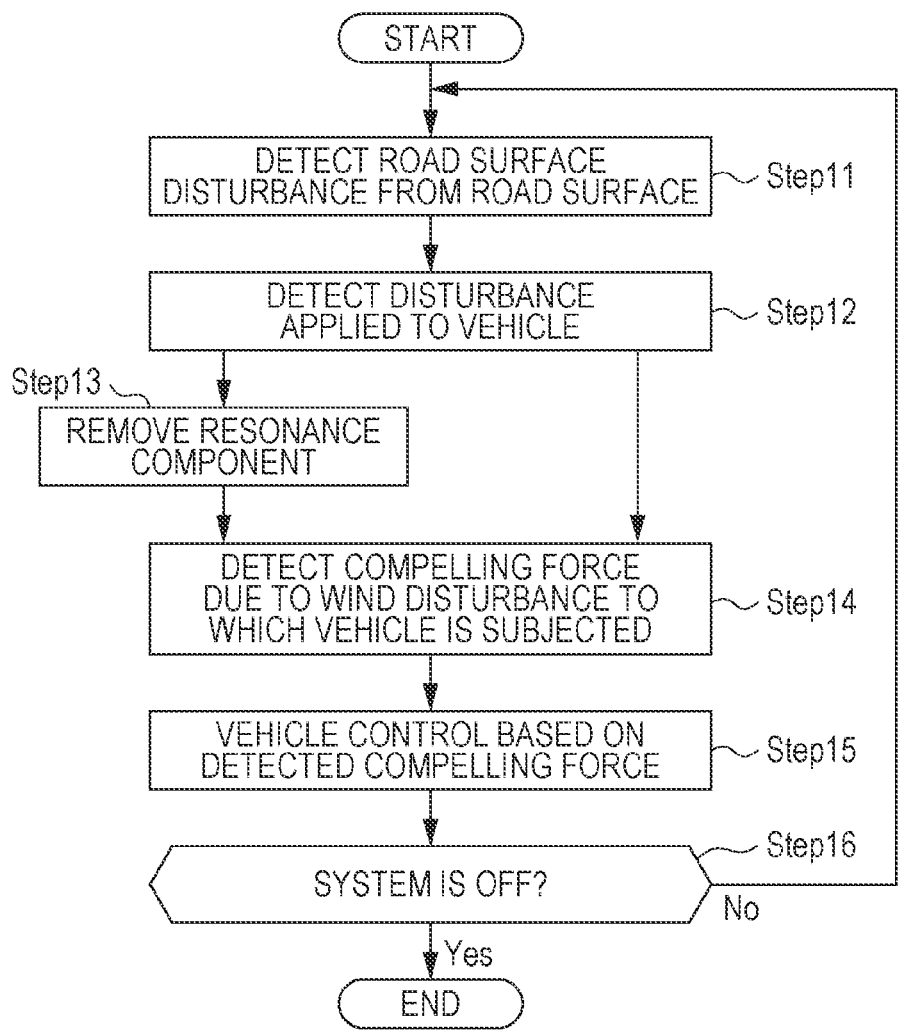
FIG. 6 is a flowchart illustrating a wind-disturbance-caused compelling-force detection method according to the first embodiment.

Next, with reference to FIGS. 6 to 8, a method of detecting a compelling force due to a wind disturbance to which the vehicle 200 is subjected while driving in the present embodiment will be described.

The compelling force detection method described below is executed via the compelling force detection apparatus 100 in the present embodiment installed in the vehicle 200.

Firstly, in step S11, the method detects a road surface disturbance received by the vehicle 200 while driving from the road surface. In one example, the unsprung mass signal obtaining unit 51 of the compelling force detection apparatus 100 obtains, from the first sensor 31 described above, the unsprung mass signal $Fz_1$ related to a road surface disturbance force (a force Fz component related to the vertical Z direction) received from the road surface on which the vehicle 200 drives.

Next, in step S12, the method detects a disturbance (body disturbance force) applied to the vehicle 200 while driving. In one example, the sprung mass signal obtaining unit 52 of the compelling force detection apparatus 100 obtains, from the second sensor 32 described above, the sprung mass signal $Fz_2$ related to a body disturbance force (a force Fz component related to the vertical Z direction) applied to the vehicle 200.

Note that the order of steps S11 and S12 described above may be reversed.

Here, in the case where the compelling force detection apparatus 100 includes the body resonance component obtaining unit 54, a body resonance component may be removed in step S13 after step S12. In one example, in step S13, the body resonance component obtaining unit 54 of the compelling force detection apparatus 100 obtains the resonance load of the body 1 applied to the vehicle 200 via the second sensor 32 described above, and performs a process of removing the resonance load by scaling it with a specified damping coefficient calculated by an experiment or a simulation on the sprung mass signal $Fz_2$ described above.

Note that step S13 may be omitted.

Next, in step S14, the method detects a compelling force due to a wind disturbance to which the vehicle 200 is subjected.

Figure 7:
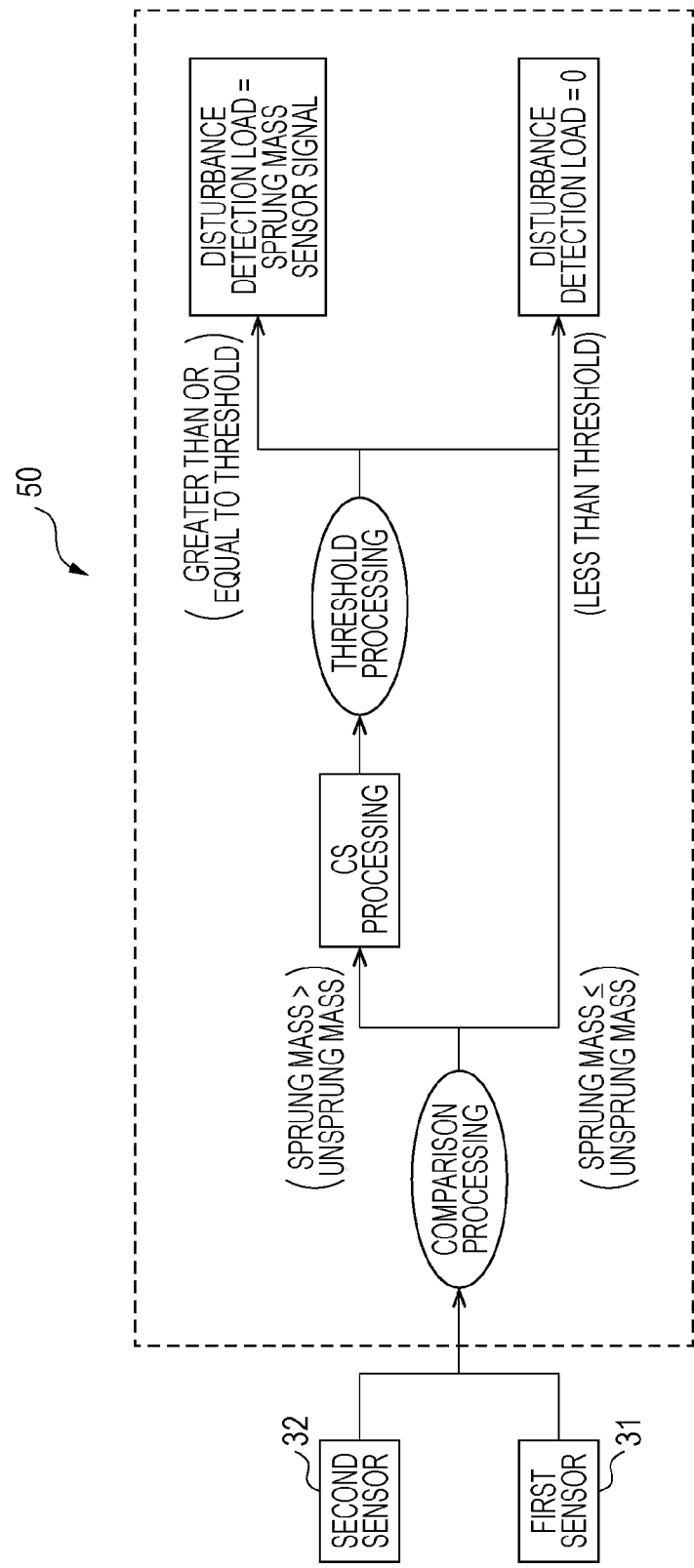
FIG. 7 is a schematic diagram illustrating signal processing flow from the first sensor and the second sensor when, for example, the vehicle is subjected to a wind disturbance (wind disturbance event)

In one example, as understood from FIG. 7, the compelling force calculation unit 55 of the compelling force detection apparatus 100 first performs comparison processing of the magnitude of the sprung mass signal $Fz_2$ described above and the magnitude of the unsprung mass signal $Fz_1$ described above. In the case where the magnitude of the unsprung mass signal $Fz_1$ is equal to or greater than the magnitude of the sprung mass signal $Fz_2$ (in the case of "sprung mass<unsprung mass" in FIG. 7), the compelling force calculation unit 55 determines that the compelling force due to the wind disturbance is zero. At this time, more precisely, the compelling force due to the wind disturbance may not be zero, but in the present embodiment, the compelling force due to the wind disturbance is evaluated as not dominant and is thus regarded as zero.

In contrast, in the case where the magnitude of the sprung mass signal $Fz_2$ is greater than the magnitude of the unsprung mass signal $Fz_1$ (in the case of "unsprung mass<sprung mass" in FIG. 7), the compelling force calculation unit 55 performs signal processing of the related art to obtain a cross spectrum and calculates the degree of phase alignment between the two signals. Although a cross spectrum is obtained to calculate the degree of phase alignment in the present embodiment, this is not the only possible case, and the coherence of these two signals may be calculated by other methods of the related art.

Figure 8:
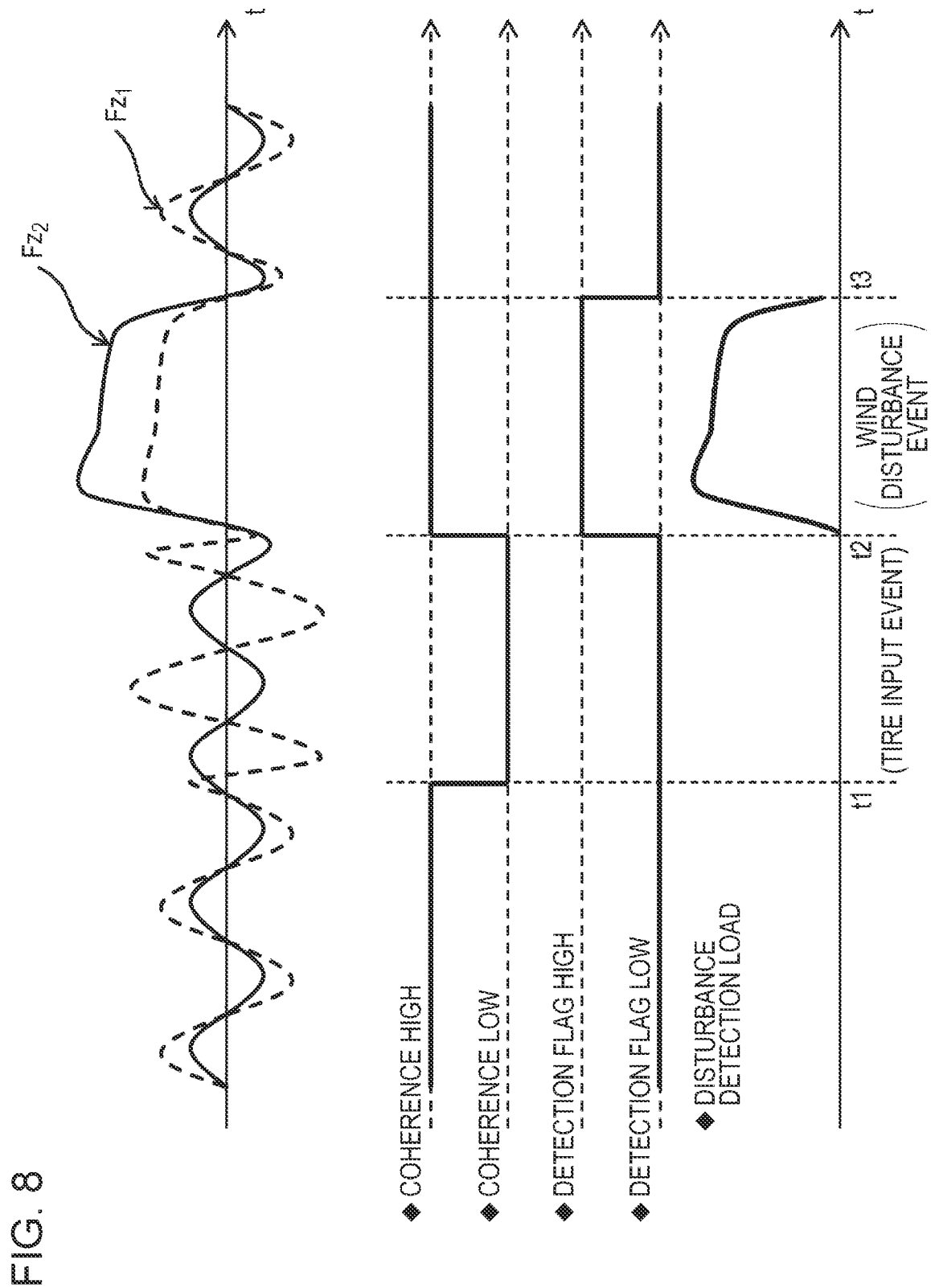
FIG. 8 is a schematic diagram illustrating exemplary signals from the first sensor and the second sensor and exemplary signal processing when, for example, the vehicle is actually driving.

As illustrated in FIG. 8, the cross spectrum or coherence of the unsprung mass signal $Fz_1$ and the sprung mass signal $Fz_2$ is not limited to be calculated in a period of "unsprung mass<sprung mass", but may also be calculated in a period of "sprung mass<unsprung mass".

Next, the compelling force calculation unit 55 determines whether the value of the calculated cross spectrum or coherence is greater than or equal to a certain threshold (see "threshold processing" in FIG. 7). There is no particular restriction on a specific numerical value of the threshold described above, and the threshold may be set to any value in the range of 0.6 to 0.9, for example, or may be set as appropriate according to the vehicle type and the driving environment (such as a region and weather). The specific threshold may be set by a driving test or simulation.

In the case where the value of the calculated cross-spectrum or coherence is greater than or equal to the certain threshold (when the unsprung mass signal $Fz_1$ and the sprung mass signal $Fz_2$ fluctuate in phase, which is during an in-phase period), the compelling force calculation unit 55 detects a load obtained by the second sensor 32 that obtains the sprung mass signal $Fz_2$ as a compelling force due to a wind disturbance. In contrast, in the case where the value of the calculated cross-spectrum or coherence is less than the certain threshold (when the unsprung mass signal $Fz_1$ and the sprung mass signal $Fz_2$ fluctuate out-of-phase, which is during an out-of-phase period), the compelling force calculation unit 55 determines that the compelling force due to the wind disturbance is zero.

FIG. 8 illustrates exemplary signals from the first sensor 31 and the second sensor 32 during actual driving and exemplary signal processing performed by the controller 50.

As understood from FIG. 8, at first, until time t1, although the phases of the unsprung mass signal $Fz_1$ and the sprung mass signal $Fz_2$ are roughly aligned, in the case where the sprung mass signal $Fz_2$ is relatively large, the value of the cross spectrum (or coherence) is less than the threshold and it is thus determined that the compelling force due to the wind disturbance is zero; and, in the case where the unsprung mass signal $Fz_1$ is relatively large, it is determined that, as described above, the compelling force due to the wind disturbance is zero.

In the period from time t1 to t2, for example, in the case where a road surface disturbance is dominant due to the effect of the above-described steering operation (a tire input event in FIG. 8), the unsprung mass signal $Fz_1$ and the sprung mass signal $Fz_2$ are roughly out of phase.

After that, in the period from time t2 to t3, the phases of the unsprung mass signal $Fz_1$ and the sprung mass signal $Fz_2$ are roughly aligned, and the value of the cross-spectrum (or coherence) of the unsprung mass signal $Fz_1$ and the sprung mass signal $Fz_2$ is also greater than or equal to the threshold. In this case (a wind disturbance event in FIG. 8), the compelling force calculation unit 55 detects, as a compelling force due to a wind disturbance, a load (in the case of adopting the vertical direction, the sprung mass signal $Fz_2$) obtained by the second sensor 32 which obtains the sprung mass signal $Fz_2$ as described above.

From time t3 in FIG. 8 onward, events up to time t1 described above are repeated. Similarly, in the case where the sprung mass signal $Fz_2$ is relatively large, the value of the cross spectrum (or coherence) is less than the threshold and it is thus determined that the compelling force due to the wind disturbance is zero; and, in the case where the unsprung mass signal $Fz_1$ is relatively large, it is determined that, as described above, the compelling force due to the wind disturbance is zero.

According to the wind-disturbance-caused compelling-force detection apparatus 100 installed in the vehicle 200 in the present embodiment described above, and to its compelling force detection method, a compelling force due to a wind disturbance, as distinguished from a road surface disturbance to which the vehicle 200 is subjected while driving, may be accurately and quickly detected.

The above-described method of detecting a compelling force due to a wind disturbance may be realized by a program executable by the compelling force detection apparatus 100.

A computer program applied to such a compelling force detection apparatus capable of detecting a compelling force due to a wind disturbance allows one or more processors to execute a process including: obtaining the above-described road surface disturbance force from the first sensor 31 disposed below, in the direction of gravity, the damper 4 supporting the wheel 3 of the vehicle 200; obtaining the above-described body disturbance force from the second sensor 32 disposed above the damper 4 in the direction of gravity; and detecting a compelling force due to a wind disturbance to which the vehicle 200 is subjected on the basis of the obtained body disturbance force and road surface disturbance force.

Figure 9:
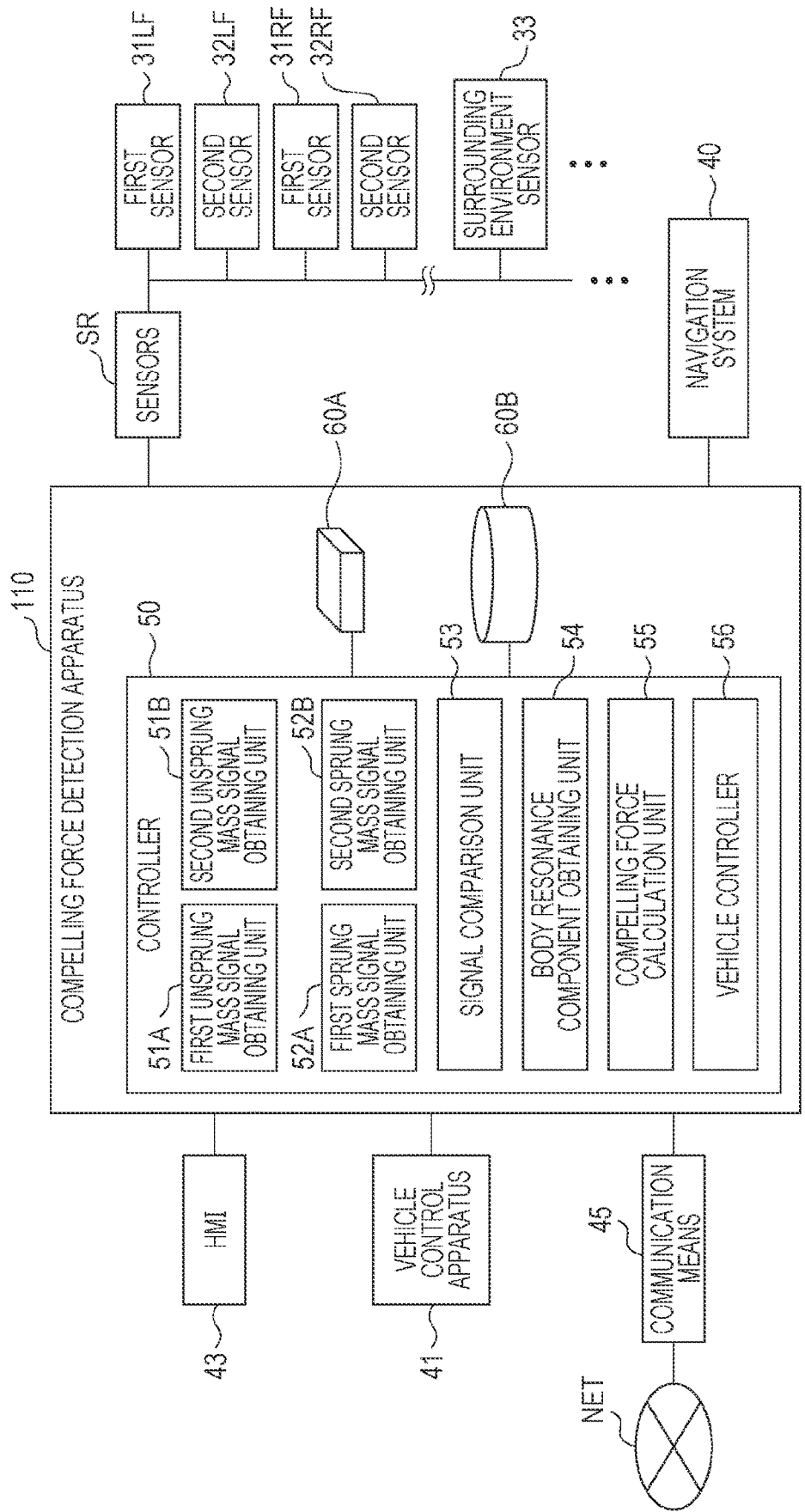
FIG. 9 is a block diagram illustrating an exemplary configuration around a control apparatus and a compelling force detection apparatus according to a second embodiment.
Figure 10:
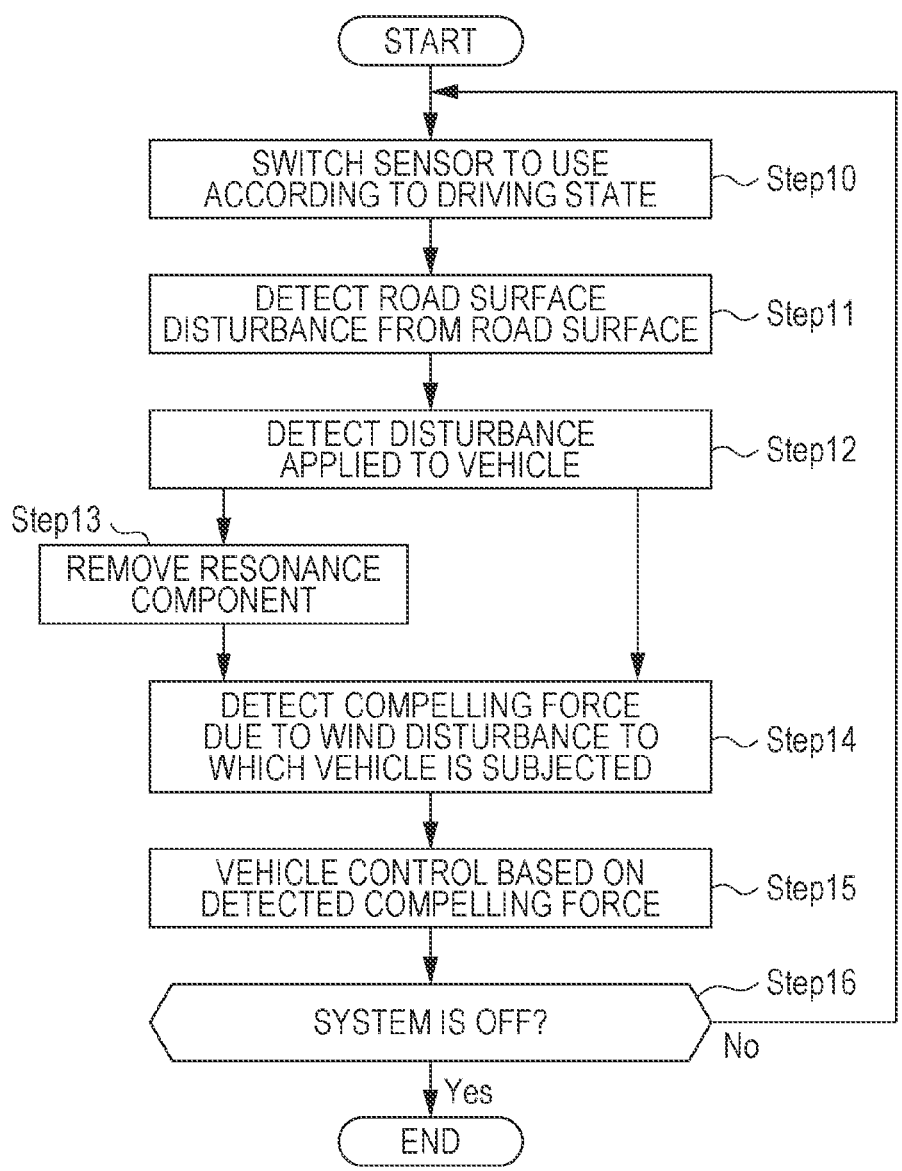
FIG. 10 is a flowchart illustrating a wind-disturbance-caused compelling-force detection method according to the second embodiment.

Next, with reference to FIGS. 9 and 10, a wind-disturbance-caused compelling-force detection apparatus 110 installed in the vehicle 200 according to a second embodiment, and its compelling force detection method will be described. The following second embodiment is mainly characterized in that, compared to the compelling force detection apparatus 100 in the first embodiment, multiple wheels 3, such as the left front wheel 3LF and the right front wheel 3RF, are each provided with the wind-disturbance compelling-force detection sensor pair 30. Therefore, in the following description, although points different from the first embodiment will be described, points that are the same as or similar to the configurations described above will be given the same reference numerals and descriptions thereof will be omitted as appropriate.

That is, the controller 50 in the second embodiment includes, instead of the unsprung mass signal obtaining unit 51 and the sprung mass signal obtaining unit 52 in the first embodiment, a first unsprung mass signal obtaining unit 51A, a second unsprung mass signal obtaining unit 51B, a first sprung mass signal obtaining unit 52A, and a second sprung mass signal obtaining unit 52B. Note that the body resonance component obtaining unit 54 in the present embodiment is not always necessary and may be omitted as appropriate.

The sensors SR in the second embodiment are configured including a first sensor 31LF, which is provided at the lower end (in one example, the hub of the wheel) of a damper 4LF corresponding to the left front wheel 3LF, and a second sensor 32LF provided at the upper end (in one example, the top mount) of the damper 4LF. Furthermore, the sensors SR in the second embodiment include a first sensor 31RF provided at the lower end (in one example, the hub of the wheel) of a damper 4RF corresponding to the right front wheel 3RF, and a second sensor 32RF provided at the upper end (in one example, the top mount) of the damper 4RF.

Although the two wind-disturbance compelling-force detection sensor pairs 30 are provided corresponding to the left front wheel 3LF and the right front wheel 3RF in the present embodiment, this is not the only possible embodiment. That is, a total of two or more wind-disturbance compelling-force detection sensor pairs 30 may be provided corresponding to the left front wheel 3LF and the left rear wheel 3LR on one side of the vehicle 200, or a total of two or more wind-disturbance compelling-force detection sensor pairs 30 may be provided corresponding to the left rear wheel 3LR and the right rear wheel 3RR on the rear wheel side of the vehicle 200.

In one example, the first unsprung mass signal obtaining unit 51A is configured with the function of obtaining, from the first sensor 31LF described above, an unsprung mass signal $Fz_{1a}$ corresponding to the left front wheel 3LF.

In addition, the second unsprung mass signal obtaining unit 51B is configured with the function of obtaining, from the first sensor 31RF described above, an unsprung mass signal $Fz_{1b}$ corresponding to the right front wheel 3RF.

In addition, the first sprung mass signal obtaining unit 52A is configured with the function of obtaining, from the second sensor 32LF described above, a sprung mass signal $Fz_{2a}$ corresponding to the left front wheel 3LF.

In addition, the second sprung mass signal obtaining unit 52B is configured with the function of obtaining, from the second sensor 32RF described above, a sprung mass signal $Fz_{2b}$ corresponding to the right front wheel 3RF.

Method of Detecting Compelling Force Due to Wind Disturbance

Next, with reference to FIG. 10, a method of detecting a compelling force due to a wind disturbance to which the vehicle 200 is subjected while driving in the present embodiment will be described.

At first, in step S10, the controller 50 switches a sensor for detecting a compelling force due to a wind disturbance according to the driving state. Examples of more specific driving states include, for example, turning sharply to the right or left, acceleration/deceleration, driving on a slope, or making a right/left turn.

For example, in the case of the driving state in which the vehicle 200 turns sharply to the right, the controller 50 performs switching so as to use the wind-disturbance compelling-force detection sensor pair 30 (first sensor 31LF and second sensor 32LF) corresponding to the left front wheel 3LF whose load is relatively increased. In addition, for example, in the case of the driving state where the load on the rear wheel side is relatively large, such as when the four-wheel drive vehicle 200 is continuously driving on a slope, the controller 50 performs switching so as to use the wind-disturbance compelling-force detection sensor pair 30 corresponding to one of the left rear wheel 3LR and the right rear wheel 3RR.

Note that the controller 50 may perform switching processing of the plural wind-disturbance compelling-force detection sensor pairs 30 according to the driving state of the vehicle 200 on the basis of route information obtained from the navigation system 40.

After that, the controller 50 executes processing from step S11 onward, which has already been described above in the first embodiment, using the switched wind-disturbance compelling-force detection sensor pair 30.

Although any of the wind-disturbance compelling-force detection sensor pairs 30 provided for multiple wheels 3 (the left front wheel 3LF and the right front wheel 3RF in this example) is selected and used in the present embodiment, at least these two wind-disturbance compelling-force detection sensor pairs 30 may be used in parallel.

According to the compelling force detection apparatus 110 and its compelling force detection method according to the second embodiment described above, in addition to the effects of the first embodiment described above, a compelling force due to a wind disturbance may be detected using the appropriate wind-disturbance compelling-force detection sensor pair 30 according to the driving state.

Although the preferred embodiments of the disclosure have been described above with reference to the accompanying drawings as described above, the disclosure is not limited to these examples. That is, it is clear for those skilled in the art to attempt further modifications on the above-described embodiments, and it is understood that these modifications also naturally fall within the technical scope of the disclosure.

The controller 50 illustrated in FIG. 3 can be implemented by circuitry including at least one semiconductor integrated circuit such as at least one processor (e.g., a central processing unit (CPU)), at least one application specific integrated circuit (ASIC), and/or at least one field programmable gate array (FPGA). At least one processor can be configured, by reading instructions from at least one machine readable tangible medium, to perform all or a part of functions of the compelling force detection apparatus 100 including the unsprung mass signal obtaining unit 51, the sprung mass signal obtaining unit 52, the signal comparison unit 53, the body resonance component obtaining unit 54, the compelling force calculation unit 55, and the vehicle controller 56. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the non-volatile memory may include a ROM and a NVRAM. The ASIC is an integrated circuit (IC) customized to perform, and the FPGA is an integrated circuit designed to be configured after manufacturing in order to perform, all or a part of the functions of the modules illustrated in FIG. 3.

The invention claimed is:

1. A vehicle compelling force detection apparatus that is installable in a vehicle and capable of detecting a compelling force due to a wind disturbance, the vehicle compelling force detection apparatus comprising:
   one or more processors; and
   one or more memories coupled to the one or more processors so as to be able to communicate with the one or more processors,
   wherein the one or more processors are configured to:
      obtain, from a first sensor, an unsprung mass signal related to a road surface disturbance force received from a road surface on which the vehicle drives via a wheel of the vehicle, and store the road surface disturbance force in the one or more memories;
      obtain, from a second sensor, a sprung mass signal related to a body disturbance force applied to the vehicle, and store the body disturbance force in the one or more memories;
      compare a magnitude of the unsprung mass signal and a magnitude of the sprung mass signal; and
      in response to the magnitude of the unsprung mass signal being less than the magnitude of the sprung mass signal, detect the compelling force due to the wind disturbance to which the vehicle is subjected, based on the body disturbance force applied to the vehicle and the road surface disturbance force, which are stored in the one or more memories, the compelling force being detected by calculating a degree of phase alignment between the body disturbance force applied to the vehicle and the road surface disturbance force,
   wherein the first sensor is disposed below, in a direction of gravity, and the second sensor is disposed above, in the direction of gravity, a damper such that the first sensor and the second sensor are arranged for the wheel,
   wherein the damper supports the wheel in the direction of gravity.

2. The vehicle compelling force detection apparatus according to claim 1, wherein
   the one or more processors are configured to:
      further obtain a resonance load of a body of the vehicle as a body disturbance force applied to the vehicle via the second sensor; and
      detect the compelling force due to the wind disturbance by removing the resonance load from at least the body disturbance force applied to the vehicle.

3. The vehicle compelling force detection apparatus according to claim 1, wherein:
   the first sensor is provided in a hub of the wheel, and
   the second sensor is provided at a fastening part between the damper and a body of the vehicle.

4. The vehicle compelling force detection apparatus according to claim 2, wherein:
the first sensor is provided in a hub of the wheel, and
the second sensor is provided at a fastening part between the damper and the body.

5. A vehicle comprising:
a first sensor disposed below a damper of the vehicle in a direction of gravity, the first sensor being configured to detect a road surface disturbance force received from a road surface via a wheel of the vehicle;
a second sensor disposed above the damper in the direction of gravity, the second sensor being configured to detect a body disturbance force applied to the vehicle; and
the vehicle compelling force detection apparatus according to claim 1.

6. A vehicle comprising:
a first sensor disposed below a damper of the vehicle in a direction of gravity, the first sensor being configured to detect a road surface disturbance force received from a road surface via a wheel of the vehicle;
a second sensor disposed above the damper in the direction of gravity, the second sensor being configured to detect a body disturbance force applied to the vehicle; and
the vehicle compelling force detection apparatus according to claim 2.

7. A vehicle comprising:
a first sensor disposed below a damper of the vehicle in a direction of gravity, the first sensor being configured to detect a road surface disturbance force received from a road surface via a wheel of the vehicle;
a second sensor disposed above the damper in the direction of gravity, the second sensor being configured to detect a body disturbance force applied to the vehicle; and
the vehicle compelling force detection apparatus according to claim 3.

8. A vehicle comprising:
a first sensor disposed below a damper of the vehicle in a direction of gravity, the first sensor being configured to detect a road surface disturbance force received from a road surface via a wheel of the vehicle;
a second sensor disposed above the damper in the direction of gravity, the second sensor being configured to detect a body disturbance force applied to the vehicle; and
the vehicle compelling force detection apparatus according to claim 4.

9. The vehicle compelling force detection apparatus according to claim 1, wherein:
the one or more processors are configured to adjust a drive torque of the vehicle based on the detected compelling force.

10. The vehicle compelling force detection apparatus according to claim 1, wherein:
the one or more processors are configured to:
in response to a coherence between the unsprung mass signal and the sprung mass signal being less than a predetermined threshold, set the compelling force due to the wind disturbance as zero; and
in response to the coherence between the unsprung mass signal and the sprung mass signal being equal to or greater than the predetermined threshold, set a load indicated by the sprung mass signal as the compelling force due to the wind disturbance.

11. The vehicle compelling force detection apparatus according to claim 5, wherein:
the one or more processors are configured to:
in response to a coherence between unsprung mass signal and the sprung mass signal being less than a predetermined threshold, set the compelling force due to the wind disturbance as zero; and
in response to the coherence between the unsprung mass signal and the sprung mass signal being equal to or greater than the predetermined threshold, set a load indicated by the sprung mass signal as the compelling force due to the wind disturbance.

12. The vehicle compelling force detection apparatus according to claim 6, wherein:
the one or more processors are configured to:
in response to a coherence between the unsprung mass signal and the sprung mass signal being less than a predetermined threshold, set the compelling force due to the wind disturbance as zero; and
in response to the coherence between the unsprung mass signal and the sprung mass signal being equal to or greater than the predetermined threshold, set a load indicated by the sprung mass signal as the compelling force due to the wind disturbance.

13. The vehicle compelling force detection apparatus according to claim 7, wherein:
the one or more processors are configured to:
in response to a coherence between the unsprung mass signal and the sprung mass signal being less than a predetermined threshold, set the compelling force due to the wind disturbance as zero; and
in response to the coherence between the unsprung mass signal and the sprung mass signal being equal to or greater than the predetermined threshold, set a load indicated by the sprung mass signal as the compelling force due to the wind disturbance.

14. The vehicle compelling force detection apparatus according to claim 8, wherein:
the one or more processors are configured to:
in response to a coherence between the unsprung mass signal and the sprung mass signal being less than a predetermined threshold, set the compelling force due to the wind disturbance as zero; and
in response to the coherence between the unsprung mass signal and the sprung mass signal being equal to or greater than the predetermined threshold, set a load indicated by the sprung mass signal as the compelling force due to the wind disturbance.

15. The vehicle compelling force detection apparatus according to claim 1, wherein:
the one or more processors are configured to:
compare a magnitude of the unsprung mass signal and a magnitude of the sprung mass signal; and
in response to the magnitude of the unsprung mass signal being equal to or greater than the magnitude of the sprung mass signal, set the compelling force due to the wind disturbance to which the vehicle is subjected as zero.

* * * * *